United States Patent [19]
Reck et al.

[11] Patent Number: 6,099,773
[45] Date of Patent: Aug. 8, 2000

[54] FORMALDEHYDE-FREE BINDER FOR MOULDINGS

[75] Inventors: Bernd Reck, Grünstadt; Eckehardt Wistuba, Bad Dürkheim; Wilhelm Friedrich Beckerle, Bobenheim-Roxheim; Axel Kistenmacher; Robert Rupaner, both of Ludwigshafen; Rainer Hummerich, Worms, all of Germany

[73] Assignee: BASF Aktiengesellschaft, Ludwigshafen, Germany

[21] Appl. No.: 09/101,805

[22] PCT Filed: Feb. 19, 1997

[86] PCT No.: PCT/EP97/00768

§ 371 Date: Aug. 21, 1998

§ 102(e) Date: Aug. 21, 1998

[87] PCT Pub. No.: WO97/31059

PCT Pub. Date: Aug. 28, 1997

[30] Foreign Application Priority Data

Feb. 21, 1996 [DE] Germany .............. 196 06 393

[51] Int. Cl.⁷ ..................................... B32B 21/02
[52] U.S. Cl. .......... 264/109; 264/121; 264/257; 156/296; 156/307.1; 156/332; 428/292.4
[58] Field of Search ............... 156/307.1, 332, 156/296; 264/109, 257, 121

[56] References Cited

FOREIGN PATENT DOCUMENTS

| | | |
|---|---|---|
| 2037214 | 10/1994 | Canada . |
| 0 583 086 | 7/1993 | European Pat. Off. . |
| 0 445 578 | 10/1994 | European Pat. Off. . |
| 0 651 088 | 10/1994 | European Pat. Off. . |
| 864 151 | 1/1953 | Germany . |
| 17 20 712 | 7/1971 | Germany . |
| 22 14 450 | 10/1972 | Germany . |
| 23 57 951 | 5/1975 | Germany . |
| 247 456 | 7/1987 | Germany . |
| 51-132295 | 11/1976 | Japan . |
| 56 104 905 | 8/1981 | Japan . |
| 02 051 531 | 2/1990 | Japan . |
| 7 407 556 | 12/1974 | Netherlands . |

*Primary Examiner*—Elizabeth M. Cole
*Attorney, Agent, or Firm*—Oblon, Spivak, McClelland, Maier & Neustadt, P.C.

[57] ABSTRACT

A method for forming shaped products by mixing a formaldehyde-free aqueous binder comprising A) a free-radically polymerized polymer containing from 5 to 100% by weight of units derived from an ethylenically unsaturated acid anhydride or from an ethylenically unsaturated dicarboxylic acid whose carboxyl group can form an anhydride group, and B) an alkanolamine having at least two hydroxyl groups, with fibers or chips to form a shaped article, wherein said binder has a property of drying at 50° C. in 72 hours to a film from 0.3 to 1 mm in thickness and, following a subsequent 15 minute cure at 130° C. in air, has a gel content of above 50% by weight, wherein the binder includes less than 0.1% by weight, based on A)+B), of a phosphorus-containing reaction accelerant with fibers or chips.

13 Claims, No Drawings

FORMALDEHYDE-FREE BINDER FOR MOULDINGS

This application is a 371 of PCT/EP97/00768 filed Feb. 19, 1997.

DESCRIPTION

The present invention relates to the use of formaldehyde-free binders for producing shaped articles and boards from finely divided natural materials, for example wood chips, wood fibers, sisal fibers, jute fibres, flax fibers or cork chips.

Shaped articles, for example boards, are frequently produced from such renewable raw materials using formaldehyde condensation resins as binders. The disadvantage of these binders is the emission of formaldehyde not only during the manufacture of the boards and shaped articles but also during their later use.

EP 445 578 discloses shaped articles composed of finely divided materials (including wood fibers) in which condensation products of a mixture comprising at least one high molecular weight polycarboxylic acid and at least one polyfunctional amine, alkanolamine or alcohol are used as binders. The disclosed high molecular weight polycarboxylic acids are polyacrylic acid poly(methyl methacrylate-co-n-butyl acrylate-co-methacrylic acid) and poly(methyl methacrylate-co-methacrylic acid). The polyhydric alcohols and alkanolamines used are 2-hydroxymethyl-1,4-butanediol, trimethylolpropane, glycerol, poly(methyl methacrylate-co-hydroxypropyl acrylate), diethanolamine and triethanolamine. Maleic acid is mentioned as a possible comonomer for preparing the high molecular weight polycarboxylic acids, but the use of maleic acid copolymers is not more particularly described. Preference is given to the use of α,β-unsaturated carboxylic acids. The use of triethanolamine as crosslinker is mentioned in an Example, but only in combination with an aqueous dispersion of a copolymer of methyl methacrylate and methacrylic acid obtained in an emulsion polymerization.

However, the water resistance of the shaped wood-fiber articles described in EP 445 578 leaves something to be desired.

EP 583 086 discloses formaldehyde-free aqueous binders for producing mechanically stable, heat-resistant glass fiber webs. The binders comprise polycarboxylic acids, polyols and a phosphorus-containing reaction accelerant. There is no mention of the binder being used for binding finely divided natural materials.

EP 651 088 describes the bonding of cellulose substrates, especially fiber webs, with aqueous compositions of polycarboxylic acids, polyols and phosphorus-containing accelerants. The presence of phosphorus-containing compounds, for example sodium hypophosphite monohydrate, as reaction accelerant is mandatory in these binders.

The production of shaped articles, especially chipboard, is mentioned as a possible use; however, the use of maleic acid or maleic anhydride copolymers together with alkanolamines for this purpose is not disclosed.

It is an object of the present invention to provide highly reactive formaldehyde-free binders for producing boards and shaped articles from finely divided natural materials. The shaped articles and boards shall have good mechanical properties, especially low water swellability.

We have found that this object is achieved by the use of a formaldehyde-free aqueous binder comprising A) a free-radically polymerized polymer containing from 5 to 100% by weight of units derived from an ethylenically unsaturated acid anhydride or from an ethylenically unsaturated dicarboxylic acid whose carboxyl groups can form an anhydride group, and B) an alkanolamine having at least two hydroxyl groups, as binder for renewable raw materials in the form of fibers or chips to produce shaped articles.

The present invention also provides shaped articles obtainable by the foregoing use.

The aqueous binder of this invention includes a polymer A) containing from 5 to 100% by weight, preferably from 5 to 50% by weight, particularly preferably from 10 to 40% by weight, of units derived from an ethylenically unsaturated acid anhydride or an ethylenically unsaturated dicarboxylic acid whose carboxyl groups are capable of forming an anhydride group (hereinafter referred to as monomer a)).

The acid anhydrides are preferably dicarboxylic anhydrides. Suitable ethylenically unsaturated dicarboxylic acids are generally those having carboxylic acid groups on vicinal carbons. The carboxylic acid groups can also be present in the form of their salts.

Preferred monomers a) are maleic acid or maleic anhydride, itaconic acid, narbornenedicarboxylic acid 1,2, 3,6-tetrahydrophthalic acid, 1,2,3,6-tetrahydrophthalic anhydride, their alkali metal and ammonium salts or mixtures thereof. Maleic acid and maleic anhydride are particularly preferred.

As well as monomer a), the polymer may additionally contain monomer b).

Suitable monomers b) are for example:

Monoethylenically unsaturated $C_3$–$C_{10}$-monocarboxylic acids, (monomer $b_1$), for example acrylic acid, methacrylic acid, ethylacrylic acid, allylacetic acid, crotonic acid, vinylacetic acid, maleic monoesters such as methyl hydrogen maleate, their mixtures and their alkali metal and ammonium salts.

Linear 1-olefins, branched-chain 1-olefins or cyclic olefins (monomer $b_2$), for example ethene, propene, butene, isobutene, pentene, cyclopentene, hexene, cyclohexene, octene, 2,4,4-trimethyl-1-pentene with or without 2,4,4-trimethyl-2-penten, $C_8$–$C_{10}$-olefin, 1-dodecene, $C_{12}$–$C_{14}$-olefin, octadecene, 1-eicosene ($C_{20}$), $C_{20}$–$C_{24}$-olefin; metallocene-catalytically prepared oligoolefins having a terminal double bond, for example oligopropene, oligohexene and oligooctadecene; cationically polymerized olefins having a high α-olefin content, for example polyisobutene.

Vinyl and allyl alkyl ethers having from 1 to 40 carbon atoms in the alkyl radical, which alkyl radical can carry further substituents such as hydroxyl, amino or dialkylamino or one or more alkoxylate groups (monomer $b_3$), for example methyl vinyl ether, ethyl vinyl ether, propyl vinyl ether, isobutyl vinyl ether, 2-ethylhexyl vinyl ether, vinyl cyclohexyl ether, vinyl-4-hydroxybutyl ether, decyl vinyl ether, dodecyl vinyl ether, octadecyl vinyl ether, 2-(diethylamino)ethyl vinyl ether, 2-(di-n-butylamino)ethyl vinyl ether, methyldiglycol vinyl ether and also the corresponding allyl ethers and mixtures thereof.

Acrylamides and alkyl-substituted acrylamides (monomer $b_4$), for example acrylamide, methacrylamide, N-tert-butylacrylamide, N-methyl(meth)acrylamide.

Sulfo-containing monomers (monomer $b_5$), for example allylsulfonic acid, methallylsulfonic acid, styrenesulfonate, vinylsulfonic acid, allyloxybenzenesulfonic acid, 2-acrylamido-2-methylpropanesulfonic acid and their corresponding alkali metal or ammonium salts or mixtures thereof.

$C_1$–$C_8$-Alkyl or $C_1$–$C_4$-hydroxyalkyl esters of acrylic acid, methacrylic acid or maleic acid, or acrylic, methacrylic or maleic esters of $C_1$–$C_{18}$-alcohols alkoxylated with from 2 to 50 mol of ethylene oxide, propylene oxide, butylene oxide or mixtures thereof (monomer $b_6$), for example methyl (meth)acrylate, ethyl (meth)acrylate, propyl (meth)acrylate, isopropyl (meth)acrylate, butyl (meth)acrylate, hexyl (meth) acrylate, 2-ethylhexyl (meth)acrylate, hydroxyethyl (meth) acrylate, hydroxypropyl (meth)acrylate, 1,4-butanediol monoacrylate, dibutyl maleate, ethyldiglycol acrylate, methylpolyglycol acrylate (11 EO), (meth)acrylic esters of $C_{13}$/$C_{15}$-oxo alcohol reacted with 3,5,7,10 or 30 mol of ethylene oxide, or mixtures thereof.

Alkylaminoalkyl (meth)acrylates or alkylaminoalkyl (meth)acrylamides or quaternization products thereof (monomer $b_7$), for example 2-(N,N-dimethylamino)ethyl (meth)acrylate, 3-(N,N-dimethylamino)propyl (meth) acrylate, 2-(N,N,N-trimethylammonio)ethyl (meth)acrylate chloride, 2-dimethylaminoethyl(meth)acrylamide, 3-dimethylaminopropyl (meth)acrylamide, 3-trimethylammoniopropyl(meth)acrylamide chloride.

Vinyl and allyl esters of $C_1$–$C_{30}$-monocarboxylic acids (monomer $b_8$), for example vinyl formate, vinyl acetate, vinyl propionate, vinyl butyrate, vinyl valerate, vinyl 2-ethylhexanoate, vinyl nonanoate, vinyl decanoate, vinyl pivalate, vinyl palmitate, vinyl stearate, vinyl laurate.

Examples of further monomers $b_9$ are:
N-vinylformamide, N-vinyl-N-methylformamide, styrene, α-methylstyrene, 3-methylstyrene, butadiene, N-vinylpyrrolidone, N-vinylimidazole, 1-vinyl-2-methylimidazole, 1-vinyl-2-methylimidazoline, N-vinylcaprolactam, acrylonitrile, methacrylonitrile, allyl alcohol, 2-vinylpyridine, 4-vinylpyridine, diallyldimethylammonium chloride, vinylidene chloride, vinyl chloride, acrolein, methacrolein and vinylcarbazole and mixtures thereof.

As well as monomer a), the polymer can additionally contain from 0 to 95% by weight of monomere b. Preferably, as well as monomer a), the polymer additionally contains monomer b in amounts from 50 to 95, particularly preferably from 60 to 90, % by weight.

Preferred monomers are acrylic acid, methacrylic acid, ethene, propene, butene, isobutene, cyclopentene, methyl vinyl ether, ethyl vinyl ether, acrylamide, 2-acrylamido-2-methylpropanesulfonic acid, vinyl acetate, styrene, butadiene, acrylonitrile and mixtures thereof.

Particular preference is given to acrylic acid, methacrylic acid, ethene, acrylamide, styrene and acrylonitrile and mixtures thereof.

Very particular preference is given to acrylic acid, methacrylic acid and acrylamide and mixtures thereof.

The polymers can be prepared according to customary polymerization processes, for example by mass, emulsion, suspension, dispersion, precipitation or solution polymerization. The polymerization processes mentioned are preferably carried out in the absence of oxygen, preferably in a stream of nitrogen. By whichever method the polymerization is carried out it is carried out in customary equipment, for example stirred tanks, stirred tank cascades, autoclaves, tubular reactors and kneaders. Preference is given to using the method of solution, emulsion, precipitation or suspension polymerization. The methods of solution and emulsion polymerization are particularly preferred. The polymerization can be carried out in solvents or diluents, for example toluene, o-xylene, p-xylene, cumene, chlorobenzene, ethylbenzene, technical-grade mixtures of alkylaromatics, cyclohexane, technical-grade aliphatics mixtures, acetone, cyclohexanone, tetrahydrofuran, dioxane, glycols and glycol derivatives, polyalkylene glycols and derivatives thereof, diethyl ether, tert-butyl methyl ether, methyl acetate, isopropanol, ethanol, water or mixtures such as, for example, isopropanol/water mixtures. The preferred solvent or diluent is water with or without proportions of up to 60% by weight of alcohols or glycols. The use of water is particularly preferred.

The polymerization can be carried out at temperatures from 20 to 300° C., preferably from 60 to 200° C. Depending on the choice of polymerization conditions, it is possible to obtain weight average molecular weights for example within the range from 800 to 5 000 000, especially from 1 000 to 1 000 000. The weight average molecular weights Mw are preferably within the range from 2000 to 400 000. Mw is determined by gel permeation chromatography.

The polymerization is preferably carried out in the presence of compounds forming free radicals. These compounds are required in an amount of up to 30, preferably 0.05 to 15, particularly preferably from 0.2 to 8, % by weight, based on the monomers used in the polymerization. In the case of multicomponent initiator systems (eg. redox initiator systems), the foregoing weights are based on the sum total of the components.

Examples of suitable polymerization initiators are peroxides, hydroperoxides, peroxodisulfates, percarbonates, peroxyesters, hydrogen peroxide and azo compounds. Examples of initiators which can be water-soluble or else water-insoluble are hydrogen peroxide, dibenzoyl peroxide, dicyclohexyl peroxodicarbonate, dilauroyl peroxide, methyl ethyl ketone peroxide, di-tert-butyl peroxide, acetylacetone peroxide, tert-butyl hydroperoxide, cumene hydroperoxide, tert-butyl perneodecanoate, tert-amyl perpivalate, tert-butyl perpivalate, tert-butyl perneohexanoate, tert-butyl per-2-ethylhexanoate, tert-butyl perbenzoate, lithium, sodium, potassium and ammonium peroxodisulfate, azodiisobutyronitrile, 2,2'-azobis(2-amidinopropane) dihydrochloride, 2-(carbamoylazo)isobutyronitrile and 4,4-azobis(4-cyanovaleric acid).

The initiators can be used alone or mixed with each or one another, for example mixtures of hydrogen peroxide and sodium peroxodisulfate. The polymerization in aqueous medium is preferably carried out using water-soluble initiators.

It is equally possible to use the known redox initiator systems as polymerization initiators. Such redox initiator systems include at least one peroxide-containing compound combined with a redox coinitiator, for example reducing sulfur compounds, for example bisulfites, sulfites, thiosulfates, dithionites and tetrathionates of alkali metals and ammonium compounds. For instance, combinations of peroxodisulfates with alkali metal or ammonium bisulfites can be used, for example ammonium peroxodisulfate and ammonium disulfite. The ratio of peroxide-containing compound to redox coinitiator is within the range from 30:1 to 0.05:1.

The initiators or redox initiator systems can be combined, in addition, with transition metal catalysts, for example salts of iron, cobalt, nickel, copper, vanadium and manganese. Examples of suitable salts are iron(II) sulfate, cobalt(II) chloride, nickel(II) sulfate, copper(I) chloride. Based on monomers, the reducing transition metal salt is used in a concentration of from 0.1 ppm to 1 000 ppm. For instance, combinations of hydrogen peroxide with iron(II) salts can be used, for example 0.5 to 30% of hydrogen peroxide with 0.1 to 500 ppm of Mohr's salt.

Similarly, a polymerization in organic solvents can be carried out using the abovementioned initiators combined with redox coinitiators and/or transition metal catalysts, for example benzoin, dimethylaniline, ascorbic acid combined with solvent-soluble complexes of heavy metals, such as copper, cobalt, iron, manganese, nickel and chromium. The amounts of redox coinitiators or transition metal catalysts customarily used here customarily range from about 0.1 to 1 000 ppm, based on the amounts of the monomers used.

If the polymerization of the reaction mixture is started at the lower limit of the suitable temperature range for the polymerization and subsequently completed at a higher temperature, it is advantageous to use at least two different initiators which decompose at different temperatures, so that a sufficient concentration of free radicals is available within every temperature interval.

To prepare polymers having a low average molecular weight it is frequently advantageous to carry out the copolymerization in the presence of regulators. Customary regulators can be used for this, for example organic SH-containing compounds, such as 2-mercaptoethanol, 2-mercaptopropanol, mercaptoacetic acid, tert-butyl mercaptan, n-octyl mercaptan, n-dodecyl mercaptan and tert-dodecyl mercaptan, $C_1-C_4$-aldehydes, such as formaldehyde, acetaldehyde, propionaldehyde, hydroxylammonium salts such as hydroxylammonium sulfate, formic acid, sodium bisulfite or isopropanol. The polymerization regulators are generally used in amounts from 0.1 to 10% by weight, based on the monomers. The average molecular weight can also be influenced by the choice of suitable solvent. For instance, polymerization in the presence of diluents having benzylic hydrogen atoms leads to a reduced average molecular weight due to chain transfer.

To prepare higher molecular weight copolymers it is frequently advantageous to carry out the polymerization in the presence of crosslinkers. Such crosslinkers are compounds having two or more ethylenically unsaturated groups, for example diacrylates or dimethacrylates of at least dihydric saturated alcohols, eg. ethylene glycol diacrylate, ethylene glycol dimethacrylate, 1,2-propylene glycol diacrylate, 1,2-propylene glycol dimethacrylate, 1,4-butanediol diacrylate, 1,4-butanediol dimethacrylate, hexanediol diacrylate, hexanediol dimethacrylate, neopentylglycol diacrylate, neopentylglycol dimethacrylate, 3-methylpentanediol diacrylate and 3-methylpentanediol dimethacrylate. Similarly the acrylic and methacrylic esters of alcohols having more than 2 OH groups can be used as crosslinkers, eg. trimethylolpropane triacrylate or trimethylolpropane trimethacrylate. A further class of crosslinkers are diacrylates or dimethacrylates of polyethylene glycols or polypropylene glycols having molecular weights from 200 to 9 000 in each case. Polyethylene glycols and polypropylene glycols used for preparing the diacrylates or dimethacrylates preferably have a molecular weight of from 400 to 2 000 in each case. As well as the homopolymers of ethylene oxide and propylene oxide it is also possible to use block copolymers of ethylene oxide and propylene oxide or copolymers of ethylene oxide and propylene oxide containing the ethylene oxide and propylene oxide units in random distribution. The oligomers of ethylene oxide or propylene oxide are also suitable for preparing the crosslinkers, eg. diethylene glycol diacrylate, diethylene glycol dimethacrylate, triethylene glycol diacrylate, triethylene glycol dimethacrylate, tetraethylene glycol diacrylate and/or tetraethylene glycol dimethacrylate.

Suitable crosslinkers further include vinyl acrylate, vinyl methacrylate, vinyl itaconate, divinyl adipate, butanediol divinyl ether, trimethylolpropane trivinyl ether, allyl acrylate, allyl methacrylate, pentaerythritol triallyl ether, triallylsucrose, pentaallylsucrose, pentaallylsaccharose, methylenebis(meth)acrylamide, divinylethyleneurea, divinylpropyleneurea, divinylbenzene, divinyldioxane, triallyl cyanurate, tetraallylsilane, tetravinylsilane and bis- or polyacryloylsiloxanes (eg. Tegomers® from Th. Goldschmidt AG) The crosslinkers are preferably used in amounts from 10 ppm to 5% by weight, based on the monomers to be polymerized.

If the method of emulsion, precipitation, suspension or dispersion polymerization is used, it can be advantageous to stabilize the polymer droplets or particles by means of interface-active auxiliaries. Typically these are emulsifiers or protective colloids. Emulsifiers used can be anionic, nonionic, cationic or amphoteric. Examples of anionic emulsifiers are alkylbenzenesulfonic acids, sulfonated fatty acids, sulfosuccinates, fatty alcohol sulfates, alkylphenol sulfates and fatty alcohol ether sulfates. Examples of usable nonionic emulsifiers are alkylphenol ethoxylates, primary alcohol ethoxylates, fatty acid ethoxylates, alkanolamide ethoxylates, fatty amine ethoxylates, EO/PO block copolymers and alkylpolyglucosides. Examples of cationic and amphoteric emulsifiers used are quaternized amine alkoxylates, alkylbetaines, alkylamidobetaines and sulfobetaines.

Examples of typical protective colloids are cellulose derivatives, polyethylene glycol, polypropylene glycol, copolymers of ethylene glycol and propylene glycol, polyvinyl acetate, polyvinyl alcohol, polyvinyl ether, starch and starch derivatives, dextran, polyvinylpyrrolidone, polyvinylpyridine, polyethyleneimine, polyvinylimidazole, polyvinylsuccinimide, polyvinyl-2-methylsuccinimide, polyvinyl-1,3-oxazolid-2-one, polyvinyl-2-methylimidazoline and maleic acid or anhydride copolymers as described for example in DE 2 501 123.

The emulsifiers or protective colloids are customarily used in concentrations from 0.05 to 20% by weight, based on the monomers.

If the polymerization is carried out in aqueous solution or dilution, the monomers can be wholly or partly neutralized with bases before or during the polymerization. Examples of suitable bases are alkali metal and alkaline earth metal compounds such as sodium hydroxide, potassium hydroxide, calcium hydroxide, magnesium oxide, sodium carbonate; ammonia; primary, secondary and tertiary amines, such as ethylamine, propylamine, monoisopropylamine, monobutylamine, hexylamine, ethanolamine, dimethylamine, diethylamine, di-n-propylamine, tributylamine, triethanolamine, dimethoxyethylamine, 2-ethoxyethylamine, 3-ethoxypropylamine, dimethylethanolamine, diisopropanolamine and morpholine.

Polyacid amines can also be used for neutralization, for example ethylenediamine, 2-diethylaminoethylamine, 2,3-diaminopropane, 1,2-propylenediamine, dimethylaminopropylamine, neopentanediamine, hexamethylenediamine, 4,9-dioxadodecane-1,12-diamine, polyethyleneimine or polyvinylamine.

Ammonia, triethanolamine and diethanolamine are preferred for partially or completely neutralizing the ethylenically unsaturated carboxylic acids before or during the polymerization.

The ethylenically unsaturated carboxylic acids are particularly preferably not neutralized before and during the polymerization. It is similarly preferred not to add a neutralizing agent after the polymerization either, apart from alkanolamine B). The polymerization can be carried out continuously or batchwise according to a multiplicity of variants. It is customary to introduce part of the monomers as initial charge, if necessary in a suitable diluent or solvent and in the absence or presence of an emulsifier, a protective colloid or further assistants, to provide a blanket of an inert gas, and to raise the temperature until the desired polymerization temperature is achieved. However, the initial charge may also be a suitable diluent alone. The free-radical initiator, further monomers and other assistants, for example regulators or crosslinkers, each in a diluent, if necessary, are metered in over a defined period. The addition times may differ in length. For example, the initiator may be added over a longer period than the monomer.

If the polymer is obtained in water following a solution polymerization, there is usually no need to separate off the solvent. If it is nonetheless desired to isolate the polymer, this can be done by spray drying, for example.

If the polymer is prepared by the method of solution, precipitation or suspension polymerization in a solvent or solvent mixture which is volatile in steam, the solvent can be removed by introducing steam into the reaction mixture in order that an aqueous solution or dispersion may be obtained in this way. The polymer can also be separated from the organic diluent by a drying process.

Polymers A) are preferably present in the form of an aqueous dispersion or solution having solids contents from preferably 10 to 80%, in particular from 40 to 65%, by weight.

Polymer A) can also be obtained by grafting maleic acid or maleic anhydride or a monomer mixture comprising maleic acid or maleic anhydride onto a grafting base. Examples of suitable grafting bases are monosaccharides, oligosaccharides, modified polysaccharides and alkylpolyglycol ethers. Such graft polymers are described for example in DE 4 003 172 and EP 116 930.

Component B) comprises alkanolamines having at least two OH groups. Preference is given to alkanolamines of the formula

I

where $R^1$ is hydrogen, $C_1$–$C_{10}$-alkyl or $C_1$–$C_{10}$-hydroxyalkyl and $R^2$ and $R^3$ are each $C_1$–$C_{10}$-hydroxyalkyl.

It is particularly preferable for $R^2$ and $R^3$ to be independently of each other $C_2$–$C_5$-hydroxyalkyl and $R^1$ to be hydrogen, $C_1$–$C_5$-alkyl or $C_2C_5$-hydroxyalkyl.

Examples of suitable compounds of the formula I are diethanolamine, triethanolamine, diisopropanolamine, triisopropanolamine, methyldiethanolamine, butyldiethanolamine and methyldiisopropanolamine. Triethanolamine is particularly preferred.

The formaldehyde-free binders of this invention are preferably prepared by using polymer A) and alkanolamine B) in such a relative ratio that the molar ratio of carboxyl groups of component A) to the hydroxyl groups of component B) is within the range from 20:1 to 1:1, preferably within the range from 8:1 to 5:1, particularly preferably within the range from 5:1 to 1.7:1 (anhydride groups are here calculated as 2 carboxyl groups).

The formaldehyde-free aqueous binders of this invention are prepared for example simply by adding the alkanolamine to the aqueous dispersion or solution of polymer A).

The binders of this invention preferably include less than 1.5% by weight, particularly preferably less than 1.0% by weight, very particularly preferably less than 0.5% by weight, especially less than 0.3% by weight, in particular less than 0.1% by weight, based on the sum of A)+B), of a phosphorus-containing reaction accelerant. Phosphorus-containing reaction accelerants are mentioned in U.S. Pat. Nos. 651,088 and 583,086. They are in particular alkali metal hypophosphites, phosphites, polyphosphates, dihydrogenphosphates, polyphosphoric acid, hypophosphoric acid, phosphoric acid, alkylphosphinic acid and oligomers and polymers of these salts and acids.

The binders of this invention preferably include no phosphorus-containing reaction accelerants, or amounts of a phosphorus-containing compound effective for reaction acceleration. The binders of this invention may include an esterification catalyst, for example sulfuric acid or p-toluenesulfonic acid or titanates or zirconates. The binders of this invention can be used as impregnants or coatings. The binders of this invention can be the sole constituent of said impregnants or coatings. However, the impregnants or coatings may additionally include further additives suitable for the particular intended use. Examples of suitable additives are dyes, pigments, biocides, hydrophobicizing agents, wetting agents, plasticizers, thickeners, adhesion improvers, reductants and transesterification catalysts.

The binders of this invention dry at 50° C. in 72 hours to a film from 0.3 to 1 mm in thickness and, following a subsequent 15 minutes' cure at 130° C. in air, preferably have a gel content of above 50% by weight, particularly preferably of above 60% by weight, very particularly preferably above 70% by weight.

After curing, the cured films are stored at 23° C. in water for 48 hours. Solubles remain in the water. The film is then dried at 50° C. to constant weight and weighed. The weight corresponds to the gel content calculated in % by weight, based on the weight before the volatiles are separated off. Constant weight is achieved when the weight decrease over 3 hours is less than 0.5, in particular less than 0.1% by weight.

The binders are used for producing shaped articles from fibers or chips and may include further additives, for example insecticides, fungicides or fillers, hydrophobicizing agents, such as silicone oils, paraffins, waxes, fatty soaps, water retention aids, wetting agents, flame retardants, such as borates and aluminum hydroxide. The chips or fibers can be chips or fibers composed of renewable raw materials or synthetic or natural fibers, for example from post-use clothing. Suitable renewable raw materials include in particular sisal, jute, flax, coir fibers, banana fibers, hemp and cork. Particular preference is given to wood fibers or wood chips.

The shaped articles preferably have a density of from 0.4 to 1.0 g/cm3 at 23° C.

Contemplated shaped articles include boards. The boards are generally at least 1 mm, preferably at least 2 mm, in thickness. Also contemplated are automotive interior parts, for example door inner linings, dashboard members and parcel shelves.

The weight of binder used is generally from 0.5 to 40% by weight, preferably from 1 to 15% by weight (binder solids, calculated as sum of A)+B)), based on the fibers or chips.

The fibers or chips can be directly coated with the binder or mixed with the aqueous binders. The viscosity of the aqueous binder is preferably (especially for the production of shaped articles from wood fibers or wood chips) set to within the range from 10 to 10 000, particularly preferably from 50 to 1 500, very particularly preferably from 100 to 1 000, mPa.s (DIN 53019, rotary viscometer at 41 sec−1).

The mixture of fibers or chips and the binder can be predried for example at from 10 to 150° C. and then be pressed for example at temperatures from 50 to 300° C., preferably from 100 to 250° C., particularly preferably from 140 to 225° C., and pressures from generally 2 to 1000 bar, preferably from 10 to 750 bar, particularly preferably from 50 to 500 bar, to form shaped articles.

The binders are particularly suitable for producing woodbase materials such as wood chipboard and wood fiberboard (cf. Ullmann's Encyclopädie der technischen Chemie, 4th Edition 1976, Volume 12, p. 709–727), which can be produced by bonding subdivided wood, for example wood chips and wood fibers. The water resistance of woodbase materials can be increased by adding a commercially available aqueous paraffin dispersion or other hydrophobicizing agent to the binder or beforehand or subsequently to the fibers or chips.

The manufacture of chipboard is common knowledge and described for example in H. J. Deppe, K. Ernst Taschenbuch der Spanplattentechnik, 2nd Edition, Verlag Leinfelden 1982.

Preference is given to using chips whose average thickness is on average within the range from 0.1 to 2 mm, in particular from 0.2 to 0.5 mm, and which have a water content of less than 6% by weight. The binder which is applied as uniformly as possible to the wood chips using a weight ratio of binder:wood chip, based on the solids content (calculated as A)+B)), which is preferably within the range from 0.02:1 to 0.3:1. Uniform distribution is obtained for example by spraying a finely divided form of the binder onto the chips.

The resin-bound wood chips are then sprinkled out to form a layer with a very uniform surface, the thickness of the layer depending on the thickness desired for the ready-produced chipboard. The sprinkled layer is pressed at a temperature of for example from 100 to 250° C., preferably from 140 to 225° C. and pressures of customarily from 10 to 750 bar to form a dimensionally stable board. The pressing times required can vary between wide limits and are generally within the range from 15 seconds to 30 minutes.

The wood fibers of suitable quality required for manufacturing medium density fiberboard (MDF) from the binders can be produced by grinding bark-free wood chips in special mills or refiners at about 180° C.

To apply binder to them, the wood fibers are generally suspended in an air stream and the binder blown into the resulting fiber stream ("blow-line" process). The ratio of wood fiber to binder based on the dry content and solids content, respectively, is customarily within the range from 40:1 to 3:1, preferably within the range from 20:1 to 4:1. The resin-bound fibers are dried in the fiber stream at from 130 to 180° C., for example, sprinkled out to form a fiber web and compressed at pressures from 20 to 40 bar to form boards or shaped articles.

The resin-bound wood fibers can also, as described for example in DE-A-2 417 243, be processed to form a transportable fiber mat. This semifabricate can then be further processed in a second, spatially and chronologically separate step, to form plates or moldings, for example door inner linings of automotive vehicles.

The binders of this invention are also suitable for manufacturing plywood and carpentry board according to the commonly known manufacturing processes.

Other natural fiber materials such as sisal, jute, hemp, flax, coir fibers, banana fibers and other natural fibers can be processed into boards and shaped articles using the binders.

The natural fiber materials can also be used in mixtures with synthetic fibers, for example polypropylene, polyethylene, polyester, polyamides or polyacrylonitrile. In effect, these synthetic fibers can also act as cobinders alongside the binder of this invention. The proportion of synthetic fiber in this instance is preferably less than 50% by weight, in particular less than 30% by weight, very particularly preferably less than 10% by weight, based on all chips or fibers. The fibers can be processed by the wood fiberboard method. However, it is also possible for preformed natural fiber mats to be impregnated with the binders of this invention with or without the addition of a wetting aid. The impregnated mats are then pressed in the binder-moist or predried state, for example at temperatures within the range from 100 to 250° C. and pressures within the range from 10 to 100 bar, to form boards or moldings.

The shaped articles obtained according to this invention have low water absorption, low thickness swelling after water aging and high strength and are formaldehyde-free.

EXAMPLES

Abbreviations: AA=acrylic acid, MA=maleic acid

Binder A:
200 g of an aqueous solution of a copolymer of 80 AA/20 MA (solids content 44.5%, pH 0.8; Mw 160 000) are mixed with 27 g of triethanolamine
pH: 3.4
viscosity: 9 000 mPa.s (at 250 sec$^{-1}$ in a Contraves Theomat, DIN measuring system 108)
Active ingredients: 52.4% by weight (active ingredients includes all ingredients apart from water)
Gel content:
A calculated amount of the mixture is poured into a silicone mold (15×7×0.5 cm) and dried at 50° C. (72 hours) so that the thickness of the resulting film is within the range from about 0.3 to 0.7 mm.

About 1 g of the film thus prepared is cured at 130° C. for 15 min in air. The cured film is aged in distilled water at 23° C. for 48 h.

The gel content is the ratio of the weight of the water-aged film after drying back to constant weight to the original weight of the film. In the present Example it is found to be 89%.

Binder B:
200 g of an aqueous solution of a copolymer of 80 AA/20 MA (solids content 44.5%, pH 0.8; Mw 160 000) are mixed with 18 g of triethanolamine
pH: 3.0
Viscosity: 7 900 mPa.s (at 250 sec$^{-1}$ in a Contraves Rheomat, DIN measuring system 108)
Active ingredients: 49% by weight
Gel content: 83%

Binder C:
200 g of an aqueous solution of a copolymer of 55 AA/45 MA (solids content 50.0%, pH 0.8; Mw 3 000) are mixed with 30 g of triethanolamine
pH: 3.4
Viscosity: 580 mPa.s
Active ingredients: 58.8% by weight
Gel content: 55%

Binder D:
A mixture is prepared from 8 g of polyacrylic acid (K value of the sodium salt in water at 25° C.=110), 3 g of 2-hydroxymethyl-1,4-butanediol and 40 g of water
pH: 1.9
Viscosity: 130 mPa.s
Active ingredients: 22% by weight Binder E:

40% strength aqueous solution is prepared from 100 g of polyacrylic acid (Mw=10 000, degree of neutralization 25%, NaOH), 10 g of triethanolamine and 5 g of sodium hypophosphite.

pH: 4.5
Viscosity: 130 mPas
Active ingredients: 40% by weight
Gel content: 0%

Binder F (corresponds to Example 9 sample 24 of EP 651 088):

An aqueous solution is prepared from 100 g of a poly (acrylic acid/maleic acid) copolymer 55 AA/28 MA, prepared in the presence of 17% by weight of sodium hypophosphite as chain transfer agent (25 mol % NaOH neutralization) and 17 g of triethanolamine.

pH: 4.7
Viscosity: 44 mPa.s
Active ingredients: 45% by weight
Gel content: 0%

Manufacture of chipboard:

In a tumble mixer, 100 g of wood chips are admixed over 1 min with a sufficient amount of the stated binder solution that the weight content of the active ingredients of the binder is 10%, based on the dry weight of the wood chips.

Following a mixing time of 2 min, the binder-impregnated wood chips are sprinkled into a press mold 20×20 cm in size and predensified. The chips are then pressed for 10 min with a laboratory press at a molding pressure of 50 bar and a platen temperature of 190° C. to form a chipboard having a density of from about 0.6 to 0.9 g/cm³ and a thickness within the range from 6 to 8 mm.

Testing of chipboard:

The chipboard bending strength is determined according to DIN 52362.

Water absorption:

Test specimens 2.5×2.5 cm in size are aged in water at 23° C. for 24 h. The percentage weight increase of the specimens is determined by weighing the specimens after the superficially adhering water has been dabbed off.

Thickness swelling:

In the same way, the percentage increase in the board thickness during water aging is determined by means of a vernier.

Test results

| Binder | Applied concentration of active ingredients % by weight | Bending strength N/mm² | Water absorption % | Thickness swelling % |
|---|---|---|---|---|
| A | 45 | 24 | 38 | 27 |
| B | 45 | 22 | 33 | 25 |
| C | 45 | 23 | 46 | 25 |
| D* | 22 | 21 | 67 | 30 |
| E* | 20 | 21 | 110 | 50 |
| F* | 45 | 17 | 105 | 56 |

*for comparison

We claim:

1. A process for producing shaped articles, which comprises combining a formaldehyde-free aqueous binder comprising:

A) a free-radically polymerized polymer containing from 5 to 100% by weight of units derived from an ethylenically unsaturated acid anhydride or from an ethylenically unsaturated dicarboxylic acid whose carboxyl group can form an anhydride group, and B) an alkanolamine having at least two hydroxyl groups, with fibers or chips to form a shaped article, wherein said binder has a property of drying at 50° C. in 72 hours to a film from 0.3 to 1 mm in thickness and, following a subsequent 15 minute cure at 130° C. in air, has a gel content of above 50% by weight, wherein the binder includes less than 0.1% by weight, based on A)+B), of a phosphorus-containing reaction accelerant.

2. A process as claimed in claim 1, wherein the fibers or chips consist of renewable raw materials.

3. A process as claimed in claim 1, wherein the fibers are natural or synthetic fibers or mixtures thereof.

4. A process as claimed in claim 1, wherein the fibers or chips are of wood.

5. A process as claimed in claim 1, wherein the shaped articles have a minimum thickness of 1 mm.

6. A process as claimed in claim 1, wherein the shaped articles are woodbase chipboards.

7. A process as claimed in claim 1, wherein the weight of binder, calculated as total weight of A)+B), is from 0.5 to 40% by weight, based on the fibers or chips.

8. A process as claimed in claim 1, wherein polymer A) contains from 5 to 100% by weight of units derived from maleic acid or maleic anhydride.

9. A process as claimed in claim 1, wherein the alkanolamine is a compound represented by the formula:

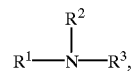

$$R^1-N(R^2)-R^3,$$  I wherein

R¹ is hydrogen, $C_1$–$C_{10}$ alkyl, or $C_1$–$C_{10}$ hydroxyalkyl, and

R² and R³ are each, independently, $C_1$–$C_{10}$ hydroxyalkyl.

10. A process as claimed in claim 1, wherein the alkanolamine is triethanolamine.

11. A process as claimed in claim 1, wherein the molar ratio of the carboxyl groups and anhydride groups, wherein 1 anhydride group is calculated as 2 carboxyl groups, of A) to the hydroxyl groups of B) is within the range from 20:1 to 1:1.

12. A process as claimed in claim 1, wherein the fibers or chips are coated or mixed with the binder and pressed at temperatures within the range from 50 to 300° C. and pressures within the range from 2 to 1000 bar to form shaped articles.

13. Shaped articles obtained by a process as claimed in claim 1.

* * * * *